United States Patent Office 2,786,782
Patented Mar. 26, 1957

2,786,782

ENAMELING GROUND-COAT COMPOSITION AND PROCESS OF APPLICATION THEREOF

Haven M. Zimmerman, Dunbar, W. Va., and Burnham W. King and John Schultz, Jr., Columbus, Ohio No Drawing. Application August 31, 1954, Serial No. 453,424

14 Claims. (Cl. 117—70)

This invention relates to a composition of matter and to a process for preparing a metallic surface for porcelain enameling. More particularly, this invention relates to a process wherein a very thin coating of a composition of matter (enamel) on a steel surface is fired so as to form a uniform mat coating in which oxides of iron are bonded with glass.

In the past, it has been thought necessary to have a uniform, continuous glass coating on the metallic surface as a ground coat for the application of a suitable porcelain enamel cover coat. A glassy coat was thought to be necessary to provide adherence of the cover coat to the metallic basis material and to eliminate reactions that would otherwise occur between the cover coat and the basis metal. Further, it was thought that glassy coatings would tend to flow and remedy any defects in the surface of the basis metal.

The earlier prior art employed materials known in the art as porcelain enamel cast-iron ground coats. These ground coats used very large amounts of relatively infusible materials, such as silica and feldspar. The cast-iron ground coats were unsatisfactory for various reasons, such as porosity, the undesirable thickness of the coating, and the poor bond between the thick ground coat and the metallic surface.

The later art used a ground coating composition known as a porcelain enamel sheet steel ground coat. These ground-coat enamels were characterized by the fact that they consisted esentially of fusible materials which, when fired, resulted in a complete re-fused glasslike surface. To obtain satisfactory adherence properties between these coats and the metal, it was thought to be necessary to make additions of costly metallic oxides of cobalt, nickel, and manganese. These ground coats also had the disadvantage of requiring surface preparation, such as pickling, and sometimes nickel plating the metallic basis material prior to coating, in order to promote adherence.

It has been discovered that, by means of the present invention, satisfactory ground coats may be obtained without the use of expensive metal oxides and without the necessity of surface preparation prior to applying the ground coat.

In the copending application of Haven M. Zimmerman, Serial No. 409,539, filed February 10, 1954, there is disclosed and claimed a flint-feldspar-borax frit comprising 110–160 parts by weight of flint, 290–390 parts feldspar, 300–340 parts dehydrated borax, 15–75 parts soda ash, 15–80 parts sodium nitrate, 60–90 parts fluorspar, 9–15 parts calcspare, and up to 5 parts red iron oxide. A frit prepared in accordance with the aforementioned copending application is mixed with conventional mill additions and ground to form a liquid slip or enameling composition, which is applied to a metallic surface to a weight of about 8 grams per square foot, dry weight, both sides, to 15 grams per square foot, dry weight, both sides, so as to form a coating which after firing is about 0.0005–0.002 inch thick. The metallic basis material thus coated with enameling composition is then fired for from 3 to 8 minutes at a temperature of from 1300° F. to 1700° F. When cooled to a handling temperature, the metallic basis material is coated with a porcelain enamel cover coat and fired again to produce an enameled metallic article. Enameled metallic articles prepared in accordance with the aforementioned copending application do not require the use of the more costly metallic oxides of cobalt, nickel, and manganese, the outer coat is extremely adherent to the prepared surface, and there is no necessity for pickling or nickel plating the metallic basis material prior to enameling.

It has been found, however, that the addition of other materials to the frit composition described in the aforementioned copending application greatly improves the properties of the enameled metallic article. Frit compositions prepared in accordance with the practice of this invention exhibit extremely good adherence to the basis metal and a minimum of objectional reaction with the porcelain enamel cover coat.

In general, this invention comprises adding black iron oxide ($Fe_3O_4$) and zinc oxide ($ZnO$) to frit compositions that contain none of the oxides ordinarily used to promote adherence. These frit compositions are applied to metal objects in extremely thin layers and are fired in air to produce a vitreous enameled object or ground coat.

Articles made of steel and enameling iron that have been coated with slips prepared from the frits of this invention and fired exhibit smoother coatings, better surface texture, more satisfactory adherence properties, and less adverse effects caused by minor variations in coating thickness than the prior art coatings. These coatings may also be fired over a wider firing range of both time and temperature and may be fired at lower temperatures.

It is an object of this invention, therefore, to provide a composition of matter for preparing a metallic surface for porcelain enameling in such manner that a conventional cover coat can be applied satisfactorily.

A further object is to provide a composition of matter for preparing a metallic surface for porcelain enameling in such manner that the surface does not require the use of conventional adherence-promoting metallic oxides, such as the oxides of cobalt, nickel, and manganese.

It is another object of this invention to provide a process for preparing a metallic surface for porcelain enameling.

It is also an object to provide a process for producing enameled metallic articles.

Other objects and advantages of the present invention will be apparent from the following detailed description thereof.

Table A, below, embodies acceptable and optimum ranges of enameling materials in the preferred frit composition. The ranges are based on theoretical frit compositions which were calculated from the batch compositions.

Table A

| Components of Ground Coat | Acceptable Range, Weight Percent | Optimum Range, Weight Percent |
|---|---|---|
| $Fe_3O_4$ | 1–15 | 5–13 |
| $ZnO$ | 0–9 | 2–7 |
| $SiO_2$ | 30–45 | 35–42 |
| $B_2O_3$ | 17–28 | 20–25 |
| $Na_2O$ and/or $K_2O$ | 11–22 | 11–22 |
| $CaO$ | 3–8 | 4–6 |
| $Al_2O_3$ | 0–7 | 3–5 |

It has been found that additional materials may be present or may be added to the preferred frit compositions which materials either provide additional desired properties as would be expected from such additions or do not adversely affect the resulting coating to any great extent.

Table B, below, lists permissible ranges of additional materials to the preferred frit. In Table B, the first four additional materials listed are considered to be most beneficial to the frit, while the other materials can be tolerated. The ranges are based on theoretical frit compositions which were calculated from the batch compositions.

Table B

| Addition Materials | Permissible Range, Weight Percent |
| --- | --- |
| $Li_2O$ | 0-7 |
| $BaO$ | 0-10 |
| $CaF_2$ | 0-8 |
| $ZrO_2$ | 0-5 |
| $Fe_2O_3$ | 0-10 |
| $TiO_2$ | 0-4 |
| $Sb_2O_3$ | 0-4 |
| $FeO$ | 0-10 |
| $MgO$ | 0-2 |
| $MnO_2$ | 0-1 |
| $NiO$ | 0-0.8 |
| $Co_3O_4$ | 0-0.6 |

It is to be understood that the ranges of the essential constituents as recited in Table A must be maintained to obtain the preferred frit composition, when addition materials are added up to amounts recited in Table B.

The raw batch compositions of this invention are made up by mixing such components as flint, feldspar, borax, soda ash, and calcspar in such a manner as to provide glass formers, fluxes and stabilizers for the resulting frit in such proportions or ranges as are defined in Table A. To this mixture is added black iron oxide and zinc oxide in such proportions as are necessary to provide the resulting frit, as defined in Table A. Other materials may be added in amounts recited in Table B.

The $Fe_3O_4$ may be added to the batch compositions as commercial black iron oxide ($Fe_3O_4$) or as other materials that will result in a theoretical frit composition of $Fe_3O_4$ as defined in Table A. In a similar manner the other oxides of the frit composition may be added to the batch composition in different forms, so long as they fall within the ranges of theoretical frit compositions as defined in Tables A and B. For instance, either boric acid and soda ash or borax by itself can be used in the raw batch composition as a source of $Na_2O$ and $B_2O_3$.

The raw batch compositions are converted into a frit by conventional means. This is generally accomplished by mechanically mixing the composition, smelting it at a temperature of about 2100° F. for about one hour, and pouring or quenching the smelted product into a water bath.

The frit composition is ground with typical mill additions, such as clay and water, in the conventional manner to form a liquid slip for enameling purposes. The liquid slip is applied to a steel surface by spraying, dipping, brushing, or other suitable means to form a coating. This coating is dried before firing. For best results, the coating should be applied to a weight of from 8 to 15 grams per square foot, dry weight, two sides, (4 to 7½ grams per square foot, dry weight, one side) so as to form a coating that will be approximately .0005 to .004 inch thick after firing.

The firing temperature may range from 1300 to 1700° F., but for best results, the preferred range is from 1400 to 1600° F.

If the coated steel surface is overfired, the coating will become mechanically weak, there may be excessive reaction with a cover coat, there will be a loss in the adhesion properties of the coating to the metal surface, and the resulting coat may exhibit a rough surface. If underfired, there will be a loss in the adhesion properties of the coating to the metal surface.

The optimum time and temperature within the ranges given are dependent on the shape and gauge of the steel basis material, the composition of the frit within the ranges given and the thickness of the slip as applied. For example, the preferred time for 29 gauge steel is from 1½ to 3½ minutes at temperature, but for heavier gauges the preferred time is longer.

After cooling to a handling temperature, the enameled article may be given a covering coat of porcelain enamel by coating and firing again in the conventional manner.

The addition of $Fe_3O_4$ alone to the preferred frit composition produces coatings that are superior in texture, adherence, and freedom from adverse effects caused by minor variations in coating thickness. It has been found, however, that small additions of zinc oxide to the composition effects still smoother coats and even more consistent results.

The glass formers of the preferred frit composition of this invention are silicon oxide ($SiO_2$) and boron oxide ($B_2O_3$). It has been found that frit compositions in which the proportions of these materials fall outside the defined ranges of Table A do not provide smooth, adherent or consistent coatings.

It is essential to include sodium oxide ($Na_2O$) or potassium oxide ($K_2O$) to provide the necessary flux addition to the preferred frit composition. Either sodium or potassium oxides or mixtures of both may be used so long as the proportion of the oxide or the mixture falls within the range defined in Table A.

Calcium oxide (CaO) is a flux material that is essential to the preferred frit composition. It is necessary to improve chemical stability.

Aluminum oxide ($Al_2O_3$) is essential for best results, and serves two purposes. First it is necessary to provide a wider practical firing range; and second, when the frit is applied as a slip, aluminum oxide produces a composition that is more easily maintained in suspension.

The addition of zinc oxide (ZnO) imparts properties to the frit that are similar to those provided by aluminum oxide in many respects, but it does not increase the refractoriness of the frit nearly so much as aluminum oxide. The resulting coating has a broader firing range and it has been found that more consistent coatings can be obtained when this addition is made.

It has been found that black iron oxide ($Fe_3O_4$) is the most essential addition to the frit composition of this invention in promoting uniform adherence and smooth coatings. Also, it increases the ranges of time and temperature over which satisfactory coatings can be produced and improves the handling properties of the slip.

Black iron oxide or other iron compounds that will provide $Fe_3O_4$ in firing and that are independent of the frit composition can be added to the ball mill when grinding the frit and preparing a slip. Such additions improve the smoothness and adherence properties to some extent, provided some $Fe_3O_4$ is present in the frit composition. The composition of the resulting slip must contain a frit material plus iron oxide in such proportions that the calculated total $Fe_3O_4$ content is equivalent to that defined in Table A.

Among the addition materials, as defined in Table B, which may be added to the preferred frit composition, lithium oxide ($Li_2O$) is a flux material that acts to lower the firing temperature of the resulting frit much farther than the additions of sodium and/or potassium oxide.

Barium oxide (BaO) is another flux material that may be present as defined in Table B. It may be used to partially replace the sodium oxide and/or potassium oxide but the total proportions of the materials must remain within the limits as defined in Table A.

Calcium fluoride ($CaF_2$) is also generally considered to be merely a flux, but it has proved to be valuable in the present invention in improving the texture of the resulting coat when kept within the range defined in Table B.

Zirconium oxide ($ZrO_2$) may be used to replace some of the silicon oxide so long as the zirconium oxide does not exceed 5 percent of the total weight of the frit.

The remaining addition materials as defined by Table B are considered to be permissible ingredients that do not materially affect the resulting coating.

The following specific examples are given to illustrate more fully the process of the present invention. They are given merely as illustrations and are not meant to limit the scope of the invention.

Raw batch compositions of enameling materials were made up in the proportions given in Table C. These compositions were smelted at about 2100° F. for one hour and fritted by pouring into a water bath. The frits contained oxide compositions, calculated from the raw batch compositions, as given in Table D.

Table C

[Smelter batch, percent by weight.]

| Composition No. | 1 | 2 | 3 | 4 | 5 |
|---|---|---|---|---|---|
| Flint | 22.80 | 26.10 | 28.20 | 21.90 | 22.90 |
| Feldspar | 17.20 | 16.50 | 16.30 | 16.05 | 18.50 |
| Borax (dehydrated) | 32.10 | 30.70 | 30.40 | 23.80 | 29.10 |
| Soda ash | 6.08 | | | | 7.05 |
| Sodium nitrate | | 4.27 | 1.57 | | 3.63 |
| Fluorspar | | 1.90 | | | |
| Calcspar | 9.19 | 4.70 | 8.71 | 8.60 | 9.86 |
| Black iron oxide ($Fe_3O_4$) | 8.42 | 9.00 | 7.98 | 7.86 | 8.96 |
| Barium carbonate | | 3.60 | 3.63 | | |
| Zinc oxide | 4.21 | 3.23 | 3.21 | 3.13 | |
| Lithium carbonate | | | | 10.60 | |
| Boric acid | | | | 8.06 | |
| Total | 100 | 100 | 100 | 100 | 100 |

Table D

[Oxide composition, percent by weight as calculated from the raw batch composition.]

| Composition No. | 1 | 2 | 3 | 4 | 5 |
|---|---|---|---|---|---|
| $SiO_2$ | 37.10 | 39.40 | 41.70 | 38.00 | 39.30 |
| $B_2O_3$ | 23.70 | 22.45 | 22.30 | 24.40 | 22.30 |
| $Na_2O$ | 14.90 | 12.10 | 11.05 | 9.05 | 16.53 |
| $K_2O$ | 2.03 | 1.92 | 1.90 | 2.04 | 2.25 |
| $Li_2O$ | | | | 5.00 | |
| $CaO$ | 5.52 | 4.23 | 5.17 | 5.50 | 6.12 |
| $BaO$ | | 2.94 | 2.98 | | |
| $ZnO$ | 4.50 | 3.41 | 3.40 | 3.64 | |
| $Al_2O_3$ | 3.24 | 3.07 | 3.04 | 3.27 | 3.60 |
| $Fe_3O_4$ | 9.01 | 9.50 | 8.46 | 9.10 | 9.90 |
| $F_2$ | | 0.98 | | | |
| Total | 100 | 100 | 100 | 100 | 100 |

Liquid slips or enameling compositions were prepared using the frit of each composition. One thousand grams of each frit was ground in a ball mill along with 107 grams of No. 5 Kentucky-Tennessee clay, 2 grams of bentonite, 1 gram of light magnesium carbonate, 2.5 grams of dehydrated borax, and 500 ml. of water. The grinding was continued until about 1 to 2 grams remained on a 200-mesh screen from a 50 ml. sample.

The slips thus prepared were applied to steel surfaces by dipping to form coatings. These coatings, after they had dried, weighed from 12 to 12½ grams per square foot of surface area, both sides.

All samples were fired for 4½ minutes. Samples coated with slip prepared from the frit of composition 1 were fired at 1500° F., composition 2 at 1530° F., composition 3 at 1560° F., composition 4 at 1470° F., and composition 5 at 1520° F.

Samples fired with the coats of compositions 1, 2, 3, and 4 all exhibited excellent coatings that were superior to prior art coatings of the same type in that the coats were smoother after firing and maintained superior surface texture and adherence. These coatings were found not to be readily affected by minor variations in coating thickness.

Samples fired with the coats of composition 5 also exhibited surface texture and adherence superior to those of the prior art but had slightly rougher surfaces than those of the other compositions.

Samples prepared from each of the compositions as described above were coated with a conventional enamel cover coat and fired. All of these samples exhibited commercially acceptable vitreous enameled surfaces.

For convenience the invention has been described herein in connection with its use on steel surfaces, but it can be used also on enameling iron, cast iron, and similar ferrous materials.

While certain preferred embodiments of this invention have been described, it will be obvious to those skilled in the art that various modifications may be made without departing from the true spirit and scope of the invention.

What is claimed is:

1. An enameling frit consisting essentially of the following calculated composition:

| | Weight percent |
|---|---|
| $Fe_3O_4$ | 1–15 |
| $ZnO$ | 0–9 |
| $SiO_2$ | 30–45 |
| $B_2O_3$ | 17–28 |
| At least one material selected from the group consisting of $Na_2O$ and $K_2O$ | 11–22 |
| $CaO$ | 3–8 |
| $Al_2O_3$ | 0–7 |

2. An enameling frit consisting essentially of the following calculated composition:

| | Weight percent |
|---|---|
| $Fe_3O_4$ | 5–13 |
| $ZnO$ | 2–7 |
| $SiO_2$ | 35–42 |
| $B_2O_3$ | 20–25 |
| At least one material selected from the group consisting of $Na_2O$ and $K_2O$ | 11–20 |
| $CaO$ | 4–6 |
| $Al_2O_3$ | 3–5 |

3. A vitreous enamel frit, suitable for use as a ground coat on a metal surface, having a firing and maturing temperature of between 1400° F. and 1600° F., consisting essentially of the following calculated composition:

| | Weight percent |
|---|---|
| $Fe_3O_4$ | 1–15 |
| $ZnO$ | 0–9 |
| $SiO_2$ | 30–45 |
| $B_2O_3$ | 17–28 |
| At least one material selected from the group consisting of $Na_2O$ and $K_2O$ | 11–22 |
| $CaO$ | 3–8 |
| $Al_2O_3$ | 0–7 |

4. A vitreous enamel frit, suitable for use as a ground coat on a metallic surface, having a firing and maturing temperature of between 1400° F. and 1600° F., consisting essentially of the following calculated composition:

| | Weight percent |
|---|---|
| $Fe_3O_4$ | 5–13 |
| $ZnO$ | 2–7 |
| $SiO_2$ | 35–42 |
| $B_2O_3$ | 20–25 |
| At least one material selected from the group consisting of $Na_2O$ and $K_2O$ | 11–20 |
| $CaO$ | 4–6 |
| $Al_2O_3$ | 3–5 |

5. An enameling composition containing a frit consisting essentially of the following calculated composition:

| | Weight percent |
|---|---|
| $Fe_3O_4$ | 1–15 |
| $ZnO$ | 0–9 |
| $SiO_2$ | 30–45 |
| $B_2O_3$ | 17–28 |
| At least one material selected from the group consisting of $Na_2O$ and $K_2O$ | 11–22 |
| $CaO$ | 3–8 |
| $Al_2O_3$ | 0–7 |

6. An enameling composition containing a frit consisting essentially of the following calculated composition:

| | Weight percent |
|---|---|
| $Fe_3O_4$ | 5–13 |
| $ZnO$ | 2–7 |
| $SiO_2$ | 35–42 |
| $B_2O_3$ | 20–25 |
| At least one material selected from the group consisting of $Na_2O$ and $K_2O$ | 11–20 |
| $CaO$ | 4–6 |
| $Al_2O_3$ | 3–5 |

7. A process of producing a vitreous enameled metal body which comprises smelting a batch containing flint, feldspar, sodium nitrate, borax, soda ash, calcspar, black iron oxide and zinc oxide in such proportions as to yield on calculated analysis a frit consisting essentially of:

| | Weight percent |
|---|---|
| $Fe_3O_4$ | 1–15 |
| $ZnO$ | 0–9 |
| $SiO_2$ | 30–45 |
| $B_2O_3$ | 17–28 |
| At least one material selected from the group consisting of $Na_2O$ and $K_2O$ | 11–22 |
| $CaO$ | 3–8 |
| $Al_2O_3$ | 0–7 | applying the resulting frit to a steel body, and firing.

8. A process of producing a vitreous enameled metal body which comprises smelting a batch containing flint, feldspar, sodium nitrate, borax, soda ash, calcspar, black iron oxide and zinc oxide in such proportions as to yield, on calculated analysis, a frit consisting essentially of:

| | Weight percent |
|---|---|
| $Fe_3O_4$ | 5–13 |
| $ZnO$ | 2–7 |
| $SiO_2$ | 35–42 |
| $B_2O_3$ | 20–25 |
| At least one material selected from the group consisting of $Na_2O$ and $K_2O$ | 11–20 |
| $CaO$ | 4–6 |
| $Al_2O_3$ | 3–5 | applying the resulting frit to a steel body, and firing.

9. A process of producing a vitreous enameled metal body which comprises smelting a batch of enameling materials in such proportions as to yield, on calculated analysis, a frit consisting essentially of:

| | Weight percent |
|---|---|
| $Fe_3O_4$ | 1–15 |
| $ZnO$ | 0–9 |
| $SiO_2$ | 30–45 |
| $B_2O_3$ | 17–28 |
| At least one material selected from the group consisting of $Na_2O$ and $K_2O$ | 11–22 |
| $CaO$ | 3–8 |
| $Al_2O_3$ | 0–7 | applying the resulting frit in an enameling slip to a steel body to a dry weight of from 8 to 15 grams per square foot, two sides, firing at a temperature of from 1300 to 1700° F. for a time from 3 to 8 minutes, applying a vitreous enamel cover coat, and refiring.

10. A process of producing a vitreous enameled metal body which comprises smelting a batch of enameling materials in such proportions as to yield, on calculated analysis, a frit consisting essentially of:

| | Weight percent |
|---|---|
| $Fe_3O_4$ | 5–13 |
| $ZnO$ | 2–7 |
| $SiO_2$ | 35–42 |
| $B_2O_3$ | 20–25 |
| At least one material selected from the group consisting of $Na_2O$ and $K_2O$ | 11–20 |
| $CaO$ | 4–6 |
| $Al_2O_3$ | 3–5 | applying the resulting frit in an enameling slip to a steel body to a dry weight of from 8 to 15 grams per square foot, two sides, firing at a temperature of from 1300 to 1700° F. for a time from 3 to 8 minutes, applying a vitreous enamel cover coat, and refiring.

11. A process for producing an enameling ground coat on a metallic article which comprises adding to a $Fe_3O_4$-containing frit sufficient $Fe_3O_4$ to effect, on calculated analysis, a material consisting essentially of:

| | Weight percent |
|---|---|
| $Fe_3O_4$ | 1–15 |
| $ZnO$ | 0–9 |
| $SiO_2$ | 30–45 |
| $B_2O_3$ | 17–28 |
| At least one material selected from the group consisting of $Na_2O$ and $K_2O$ | 11–22 |
| $CaO$ | 3–8 |
| $Al_2O_3$ | 0–7 | based on the weight of the combined frit and $Fe_3O_4$, milling a slip containing said frit and $Fe_3O_4$, coating a metallic article with said slip, and firing the same.

12. A process for producing an enameling ground coat on a metallic article which comprises adding to a $Fe_3O_4$-containing frit sufficient $Fe_3O_4$ to effect, on calculated analysis, a material consisting essentially of:

| | Weight percent |
|---|---|
| $Fe_3O_4$ | 5–13 |
| $ZnO$ | 2–7 |
| $SiO_2$ | 35–42 |
| $B_2O_3$ | 20–25 |
| At least one material selected from the group consisting of $Na_2O$ and $K_2O$ | 11–20 |
| $CaO$ | 4–6 |
| $Al_2O_3$ | 3–5 | based on the weight of the combined frit and $Fe_3O_4$, milling a slip containing said frit and $Fe_3O_4$, coating a metallic article with said slip, and firing the same.

13. A vitreous enamel frit that will form an adherent ground coat approximately .0005 to .004 inch thick when applied in an enameling slip to a steel article and fired at a temperature of from 1300 to 1700° F. for from 3 to 8 minutes, comprising the following calculated composition:

| | Weight percent |
|---|---|
| $Fe_3O_4$ | 1–15 |
| $ZnO$ | 0–9 |
| $SiO_2$ | 30–45 |
| $B_2O_3$ | 17–28 |
| At least one material selected from the group consisting of $Na_2O$ and $K_2O$ | 11–22 |
| $CaO$ | 3–8 |
| $Al_2O_3$ | 0–7 |

14. A vitreous enamel frit that will form an adherent ground coat approximately .0005 to .004 inch thick when applied in an enameling slip to a steel article and fired at a temperature of from 1300 to 1700° F., for from 3 to 8 minutes, comprising the following calculated composition:

| | Weight percent |
|---|---|
| $Fe_3O_4$ | 5–13 |
| ZnO | 2–7 |
| $SiO_2$ | 35–42 |
| $B_2O_3$ | 20–25 |
| At least one material selected from the group consisting of $Na_2O$ and $K_2O$ | 11–20 |
| CaO | 4–6 |
| $Al_2O_3$ | 3–5 |

References Cited in the file of this patent

UNITED STATES PATENTS

| 2,301,741 | Morris | Nov. 10, 1942 |
| 2,321,657 | Chester | June 15, 1943 |